United States Patent [19]

Elizondo-Gonzalez et al.

[11] Patent Number: 5,113,890
[45] Date of Patent: May 19, 1992

[54] METHOD AND APPARATUS FOR REGULATING THE FLOW OF PARTICULATE FERROMAGNETIC SOLIDS

[75] Inventors: Cesar Elizondo-Gonzalez; Virgilio Juárez-Mata; Ricardo Viramontes-Brown; Raul Quintero-Flores; Juan-Jorge Roesch-Dietlen, all of Nuevo León, Mexico

[73] Assignee: Hylsa S.A. de C.V., Monterrey, Mexico

[21] Appl. No.: 613,148

[22] Filed: Nov. 14, 1990

[30] Foreign Application Priority Data

Nov. 14, 1989 [MX] Mexico .................... 18361

[51] Int. Cl.⁵ .................... F17D 1/16; F15B 21/00
[52] U.S. Cl. .................... 137/13; 137/807; 137/827; 137/909
[58] Field of Search .................... 137/807, 827, 13, 909

[56] References Cited

U.S. PATENT DOCUMENTS

| | | | |
|---|---|---|---|
| 3,417,771 | 12/1968 | Ernst | 137/807 |
| 3,506,023 | 4/1970 | Bogart | 137/807 |
| 4,216,800 | 8/1980 | Garnier et al. | 137/827 |
| 4,463,502 | 8/1984 | Fitzgerald et al. | 137/909 |
| 4,655,237 | 4/1987 | Gloor et al. | 137/827 |
| 4,805,669 | 2/1989 | Lillicrap | 137/827 |

Primary Examiner—A. Michael Chambers
Attorney, Agent, or Firm—A. Thomas S. Safford

[57] ABSTRACT

Magnetic valve and methods related thereto for regulating the physically unobstructed flow of ferromagnetic particulate solid materials through a conduit by means of an electromagnetic and/or permanent magnetic device for establishing and controlling a magnetic field, which is caused to selectively pass along a magnetic circuit which comprises said particulate materials in said conduit to be regulated and wherein said magnetic field is deviated from said conduit or deactivated to allow the flow of said material. The valve comprises a pipe made of a non-magnetic material with at least two elements of magnetic material such as iron or carbon steel, vertically spaced apart along said pipe (which advantageously separately ring said pipe and contact the interior thereof) and a plurality of means to selectively create or eliminate or decrease the intensity of a magnetic circuit which passes through said elements and through said ferromagnetic material in such a way that said material is stopped or its flow is diminished when the magnetic field flows therethrough and the flow is allowed when said magnetic field is diminished, deleted, or deviated.

10 Claims, 5 Drawing Sheets

METHOD AND APPARATUS FOR REGULATING THE FLOW OF PARTICULATE FERROMAGNETIC SOLIDS

FIELD OF THE INVENTION

The present invention is related to a method and apparatus for regulating the flow of ferromagnetic particulate materials, and more particularly to a low wear valve for such abrasive solids. This invention has particular application in the iron and steel industry wherein various materials containing iron which are affected by magnetic fields are handled and processed.

Although the present invention has applications in other industries, it will be illustratively described herein applied to the iron and steel industry and to the materials therein handled and processed, such as iron ores, chemically reduced iron ore (e.g. which contains metallic iron, such as direct reduced iron (DRI), also called sponge iron) whether in lump or pellet form, sinter, fines and iron dust, and scrap in particles or lumps, turnings, etc.

Magnetic valves of various types have been proposed in the past but none with the improved characteristics of the present invention. An example of the prior art is disclosed in H. Ernst U.S. Pat. No. 3,417,771 which describes an apparatus for controlling the flow of magnetic materials. To stop the flow of a magnetic material this valve selectively introduces a magnetic field in a flow channel through which said material flows and deactivates said field to allow the flow. The principal application for this valve is for controlling the flow of fluids which have magnetizable particles dispersed therein.

Another example of the prior art is disclosed in T. H. Fitzgerald et al U.S. Pat. No. 4,463,502. This patent describes an apparatus for stabilizing fluidized beds which also has structure of the valve therein described, though having application in fluidized bed processes, has disadvantages which do not allow it to be used to control effectively the flow of dense solids or in large quantities.

The Fitzgerald valve has magnetic circuit forming elements extending across the material flow channel, which being subject to abrasion due to the solids would be excessively worn thereby. Also said elements interfere with the free solid flow. This is a very important fact in the design of equipment for particulate solids handling, because solid particles flow or do not flow through a channel depending on their friction characteristics both between the particles of said material or between said particles and the wall of the flow channel.

The cross section of equipment in general is minimized for reduced cost and for practical handling. It is known that the minimum cross section through which a particulate material can flow is determined by its internal friction characteristics, therefore if the section through which it has to flow is smaller than the minimum value the solids do not flow, and rather instead form bridges and hang-up in the flow channel.

Therefore, the Fitzgerald valve structure is undesirable for the industrial applications where large quantities of dense and abrasive materials are handled.

R. M. Bogart in U.S. Pat. No. 3,506,023 describes an apparatus for controlling the flow of particulate magnetic material through an orifice. The valve operates by means of a horse shoe permanent magnet which can rotate to face a flow channel formed by two sections of tubular magnetic material separated by a section of non-magnetic material. If the permanent magnet is positioned facing the flow channel with its poles being above and below of the non-magnetic material, the magnetic circuit is closed through the particles inside the flow channel and retains such particles stationary. If the magnet is rotated 90° with both poles positioned to face the non-magnetic material section, the particles will freely flow through the flow channel. This valve has many drawbacks for industrial applications wherein tons of materials in process have to be controlled, because a permanent magnet would require a very high field intensity to operate adequately. Moreover, said magnet would not be reliable for a continuous operation because in case of failure or weakening of the magnet, the operation would have to be suspended for repairing or replacing the valve or its parts.

Many prior art magnetic valves can be made to function, but are not commercially practical in large scale operations because of either the prohibitive cost and size of the permanent magnet (if used) and/or the prohibitive cost and amount of electric power to run the electromagnetic magnets for the valves.

Referring to the prior art relating to valves for controlling the flow of particulate solids in general, mechanical valves employing a barrier or a gate to oppose the flow of particles are the type most commonly in use. These valves are subject to wear due to abrasion, and the movement of the movable components is affected by the accumulation of particles or dust within the moving parts of the valve. Also, such mechanical valves typically need hydraulic mechanisms for operation.

SUMMARY OF THE INVENTION

The present invention circumvents the drawbacks of the prior art and offers various advantages for the handling of large quantities of particulate materials because it has an unobstructed flow channel made of a non-magnetic material. The invention comprises two elements of a magnetic material vertically spaced in the wall of the flow channel forming a magnetic circuit within said channel through the particulate material, means for establishing said magnetic circuit located outside of said channel, said means being an electromagnet or a permanent magnet, and means for selectively activating or deactivating said magnetic circuit through said flow channel in such a way that when the magnetic circuit is activated the particles are retained in said channel and when it is deactivated the particles will flow freely therethrough.

Moreover, the present invention has a plurality of independent means employed for establishing said magnetic circuit. With such fail-safe capability, said means can be repaired or replaced while the operation continues with the remaining means permitting a continuous operation of the valve.

It is an object of the present invention to provide a method and apparatus for controlling the flow of particulate solid materials capable of being affected by magnetic fields.

It is another object of the present invention to provide a method and apparatus for controlling the flow of particulate solid materials which have magnetic characteristics, said method and apparatus having a superior reliability which permits repairing or replacing its parts without stopping the industrial operation.

It is a further object of the present invention to provide a magnetic valve to be used in the iron and steel industry for controlling the flow of materials having metallic iron as reduced iron ore in lump or pellet form, known in the art as direct reduced iron (DRI) or sponge iron, sinter, and lumps of iron scrap, at low capital and operating costs.

DESCRIPTION OF THE DRAWINGS

In this specification and in the accompanying drawings applicants have shown and described a preferred embodiment of their invention and have suggested various alternatives and modifications thereof, but it is to be understood that these are not intended to be exhaustive and that many changes and modifications can be made within the scope of the invention. The suggestions herein are selected and included for purposes of illustration in order that others skilled in the art more fully understand the invention and the principles thereof and can be enabled to modify it and embody it in a variety of forms, each as may be best suited to the conditions of a particular use.

In the drawings.

DETAILED DESCRIPTION OF THE INVENTION

Figure 1:
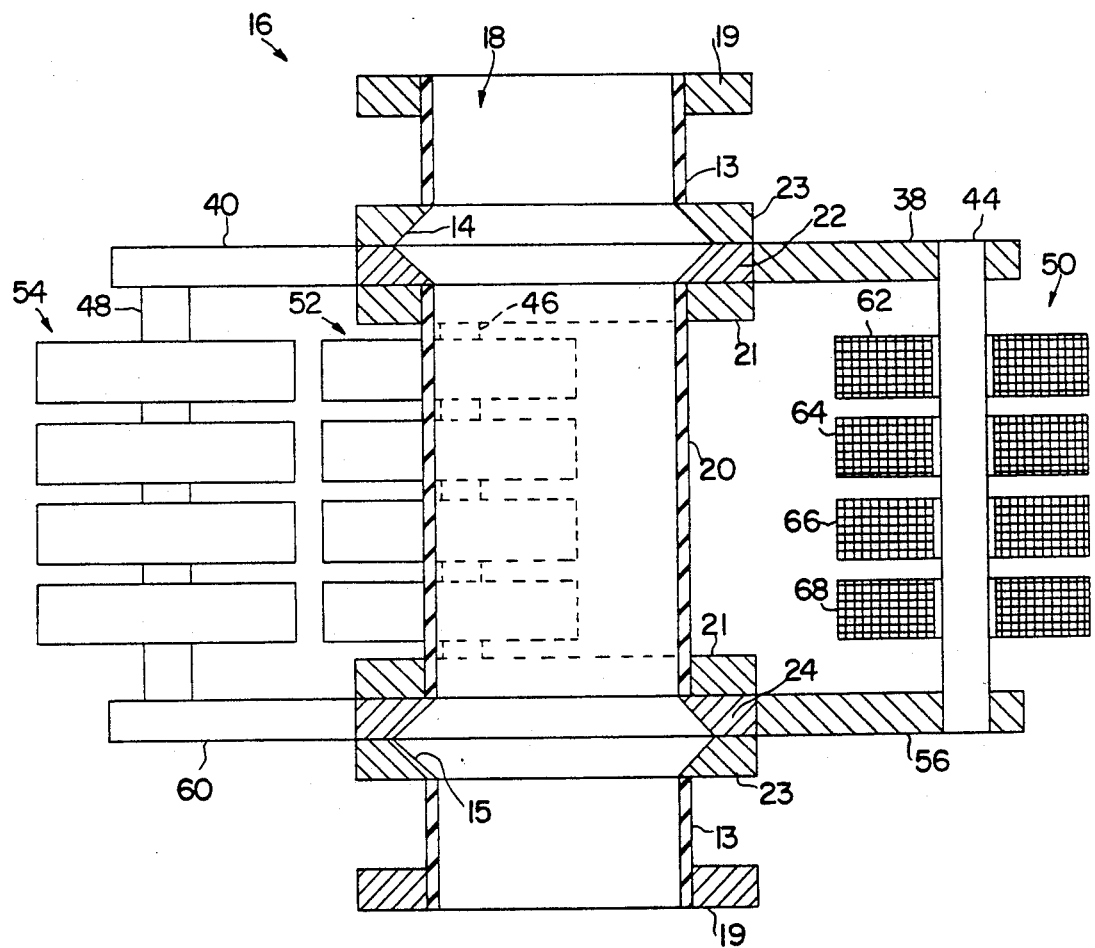
FIG. 1 is a diagrammatic side elevational view in partial section of a preferred embodiment of the magnetic valve incorporating the present invention.
Figure 2:
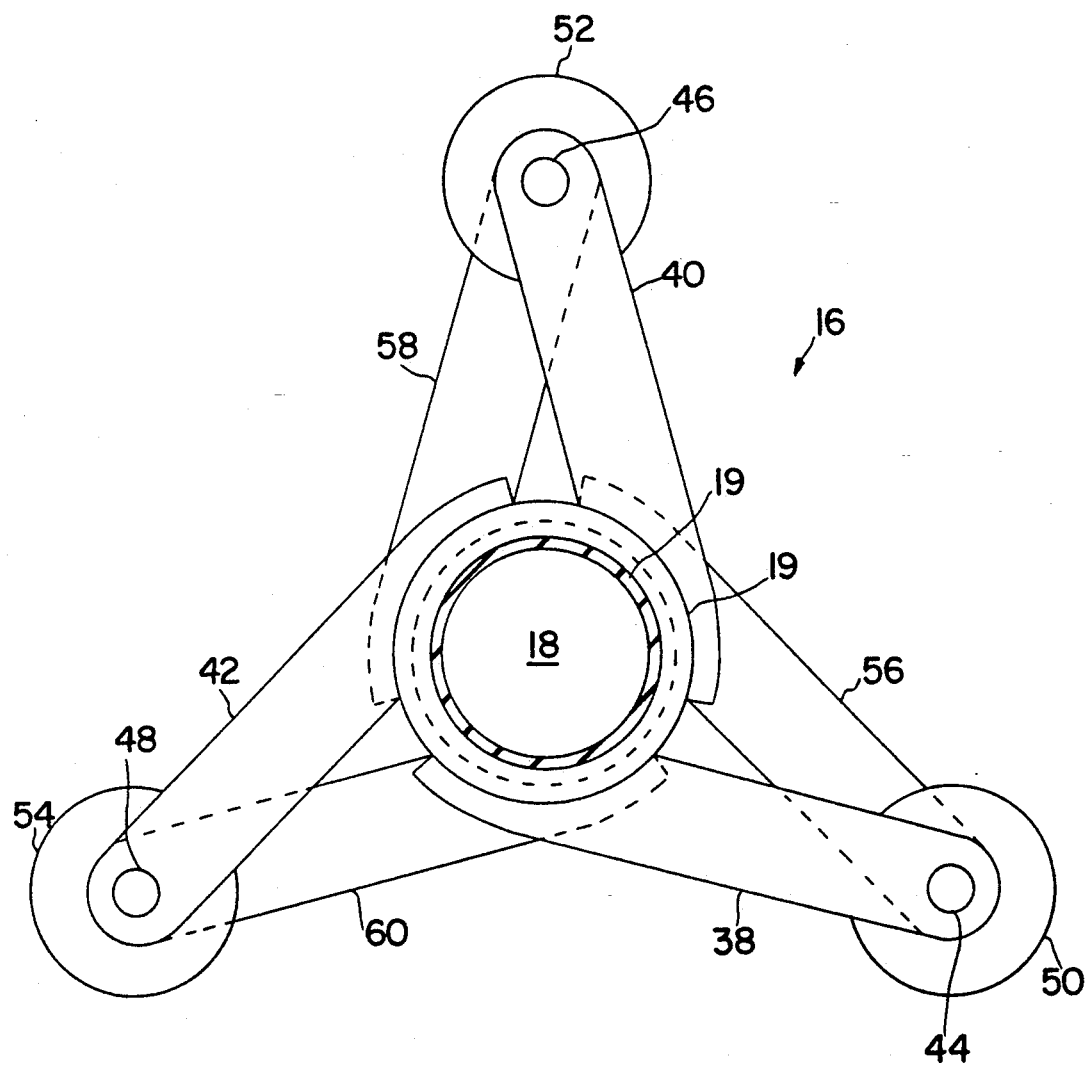
FIG. 2 is a diagrammatic plan view of the embodiment of FIG. 1.

Referring to FIGS. 1 and 2 in which the same numerals designate the same elements, a magnetic valve 16 contains a central conduit or duct 18 partially formed by a spacer pipe 20. The conduit 18, may include an upper and lower portions 13 made of a non-magnetic material which have suitable outer flanges 19 for connecting the valve 16 to the conduits through which the particulate material will flow. The extensions 13 of conduit 18 above and below the pipe 20 are each about one diameter long so a to prevent leaks of the magnetic field through the adjacent piping, which normally is made of ferromagnetic materials. Pipe 20 is also made of a non-magnetic material, such as stainless steel, through which the ferromagnetic particulate material 17, whose flow is intended to be controlled, is caused to pass. The particles 17 (shown for convenience in FIGS. 4 to 7 in regular array) will be understood to be more randomly oriented and sized in actual practice. Pipe 20 has flanges 21 at either end to reinforce and join the pipe 20 with other parts of the valve 16. The cross section of the pipe 20 can have any form as may be best adapted to a particular use of the invention, but herein the preferred form is cylindrical for facility of construction and for mechanical strength. For example, the form of pipe 20 can also be slightly conical, since it is easier to retain the material within the inclined walls of an inverted cone because of the friction between the particles and said wall.

An upper ring 22 and a lower ring 24 made of a magnetic material, such as iron or carbon steel, are arranged vertically spaced in the conduit 18, above and below the pipe 20 and constitute the terminals of a plurality of means for establishing a magnetic circuit which passes through the ferromagnetic particulate material 17 (see FIG. 4) within the pipe 20. As shown in FIG. 1, rings 22 and 24 preferably each have a bevel in their inner face which forms upper and lower recesses 14 and 15 within the conduit 18 to form a supporting area for the particles and to facilitate particle retention within pipe 20. It has been found that the recess 14 causes said particles 17 to modify their free fall trajectory facilitating their retention within the valve by the magnetic field. Further, with a magnetized mass of particles, those retained in the recess frictionally engage those in the main passage of the pipe 20 and the resulting magnetized mass of particles are locked in position along the pipe 20 without being able to slide along the pipe's surface because of those extending into the recesses 14 and 15. It has been observed that the lower recess 15 particularly forms a better support for said particles. It is evident that said recess may be formed within only one flange or produced otherwise, such as counter-beveling of the inner faces of the inner flanges 23 of the extensions 13. This latter embodiment shown in FIG. 1 has the advantage of ease of construction. It is noted that recesses 14 and 15 provide the abovesaid advantages without projecting into or otherwise interfering with the flow path of the particles. This feature is of great value when handling huge quantities of an abrasive material, such as DRI.

Rings 22 and 24 are connected by direct contact to upper arms 38, 40, and 42 which in turn are connected to core elements 44, 46 and 48 and to lower arms 56, 58, and 60. This structure is more fully appreciated in simplified FIG. 3. A cumulative magnetic field, produced by electric current applied to each of the coils 50, 52 and 54, flows in three separate magnetic circuits from each of these electro-magnets to the rings 22 and 24. When the electric current is connected to the coils, the valve "closes"; because the magnetic field of the circuits flows through and retains the ferromagnetic material 17 within the pipe 20.

FIG. 1 shows each coil 50, 52 and 54 to be made up of a plurality of coil elements 62, 64, 66 and 68 (illustrated as four) for each core 44, 46 and 48 to facilitate repairing or replacing any of the coils which may fail or be damaged. In this embodiment handling and heat dissipation of coils are easier. Cores 44, 46, and 48 are easily demountable from arms 38, 40 and 42 by means of anchor bolts (not illustrated herein) known in the art.

The advantages offered by the present invention over the prior art will be appreciated in that the herein illustrated and claimed structure offers higher reliability by having several independent magnetic circuits and several independent coils in each circuit to produce the magnetic field which retains the material in pipe 20. It is possible then to replace or repair any of the elements which constitute these circuits without interrupting the operation and function of the valve because, it continues working with the other two circuits.

The structure of the present invention, having a plurality of coil elements offers also the possibility of connecting each of said coil elements in a given magnetic circuit to a different electric phase of an alternating current supply. In this manner the reliability of the valve operation improves because if only one phase of the electricity supply fails the valve can operate with the other two. Although the valve is preferably operated with direct electric current, this arrangement can be implemented providing separate rectifiers for each phase.

Figure 3:
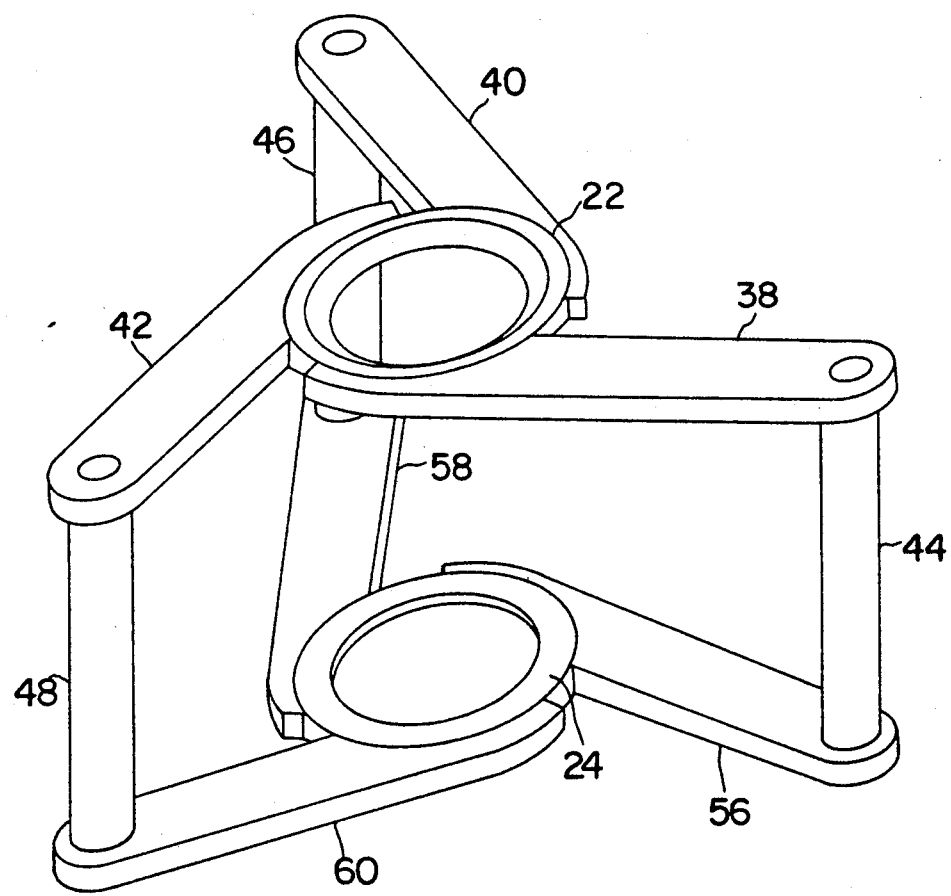
FIG. 3 is a perspective view of the elements which form the magnetic circuit of the preferred embodiment shown in FIG. 1.

Referring particularly to FIG. 3, the independent magnetic circuits are formed in such a way that the upper and lower arms in each of them are connected to points in the upper and lower rings 22 and 24 which are vertically non-aligned. This structure minimizes any tendency for short circuiting of the magnetic field through the air between the upper and lower arms. When the material is flowing rapidly through pipe 20, pipe 20 is not full of ferromagnetic particles but can be rather mostly full of air, consequently the resistance to the magnetic field inside and outside pipe 20 can be about the same and the magnetic field might tend otherwise to flow about equally outside and inside the pipe 20. In the structure shown herein the distance between the inner end portions of upper arm 42 and lower arm 60 is longer outside of the valve than inside where it remains the same as the length of the core 48, thus in the illustrated preferred embodiment the magnetic field will tend to flow preferably through the inner space of pipe 20.

Figure 7:
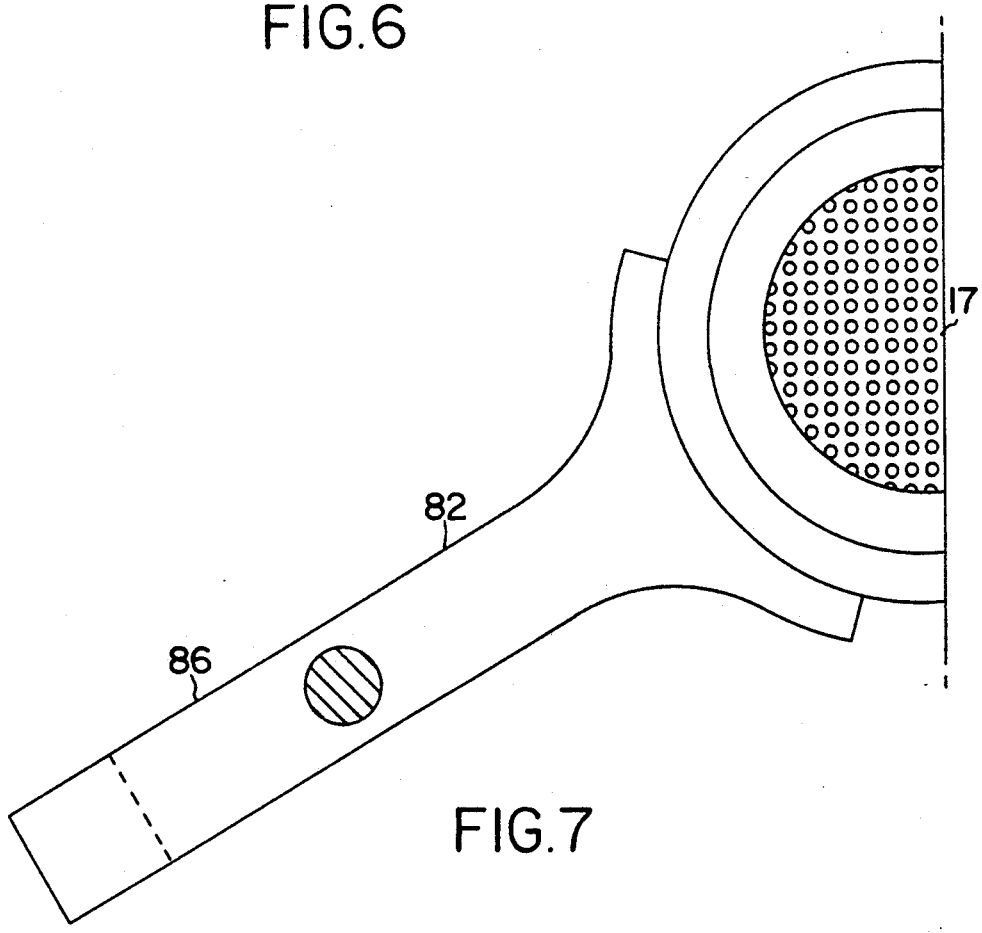
FIG. 7 is a diagrammatic plan view of the third embodiment shown on FIG. 6.

It will be evident to those skilled in the art that an embodiment of the invention constructed with vertically parallel arms, for example as shown in FIG. 7, can be made to work although not in the best conditions.

Figure 4:
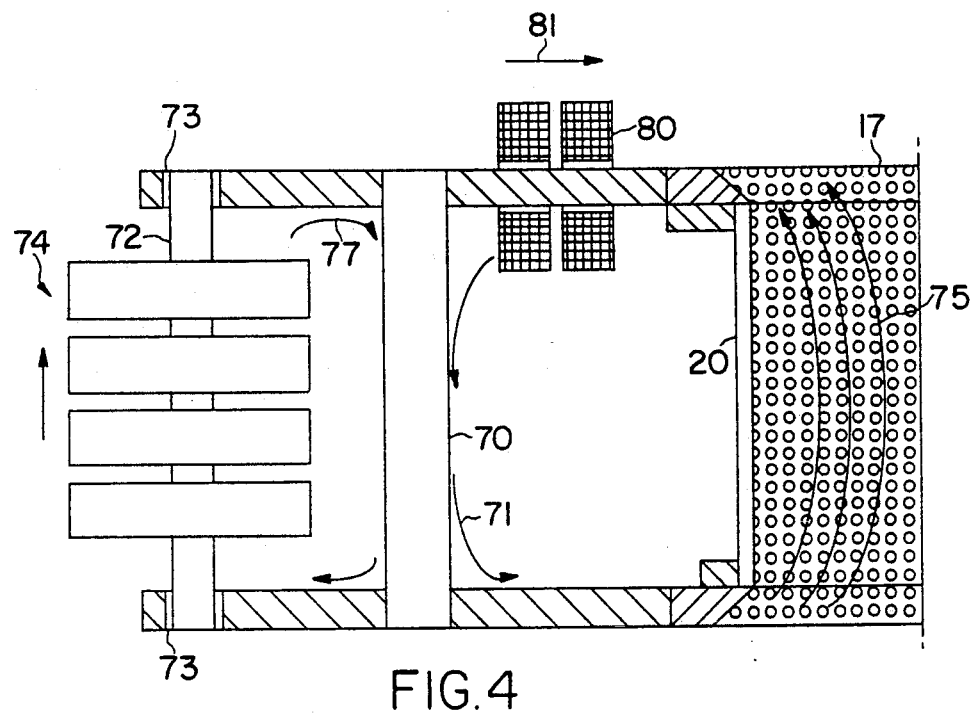
FIG. 4 is a vertical sectional view along lines 4-4 in FIG. 5 of the second embodiment of the invention in which a permanent magnet is used for establishing the magnetic circuits instead of the electric coils shown on FIGS. 1 to 3. This embodiment is a valve normally closed which is opened when the electric current is passed through the coils, while in the other embodiments shown in FIG. 1 to 3 the valve is normally open and it is closed when the electric current is passed through the coils. For the sake of simplicity, only one of the means to produce the magnetic circuit has been illustrated, but it should be understood that the remaining means are similar to that shown.
Figure 5:
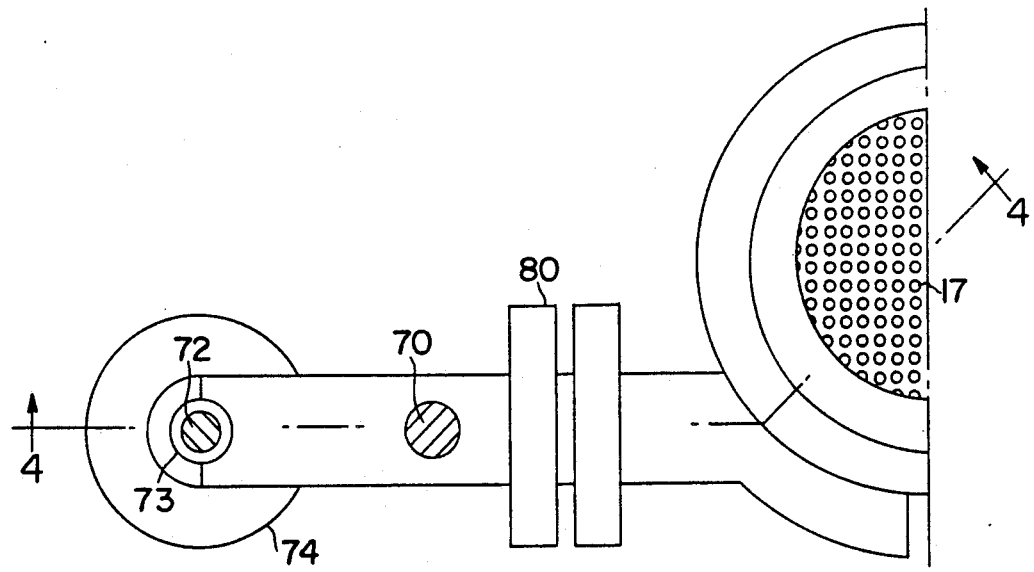
FIG. 5 is a diagrammatic plan view of the second embodiment shown in FIG. 4.

In FIGS. 4 and 5 only one of the plurality of circuits is shown to facilitate the illustration of another embodiment of the invention in which permanent magnets 70 are used instead to produce the magnetic circuits (in the direction of arrows 71 and 75) through material 17 within the pipe 20. In this embodiment the valve operates normally closed. When the electric current is passed through the coil 74, the magnetic field of magnet 70 is deviated to pass preferably through core 72 (in the direction of arrows 77), in this way weakening enough the magnetic field which passes through material 17 so that said material flows through the pipe 20. Numeral 73 represents an air gap or other non-magnetic material which functions as an opposing resistance in the magnetic circuit. In this way the magnetic field will normally tend to avoid the resistance 73 and instead pass through the particulate material 17 in pipe 20. Only when coils 74 are energized will the magnetic field find less resistance through core 72 thus weaken the magnetic field through the material 17.

Auxiliary coil 80 generates an opposing a low intensity magnetic force (in the direction of arrow 82) and helps to counteract the magnetic field of magnet 70 in the path through which the material 17 passes. This allows the coil 74 to draw even less electricity to achieve its function by an amount less than coil 80 uses.

This second embodiment, where the magnetic field needed is available through permanent magnets, offers advantages in those processes wherein it is wanted to avoid the danger that an energy failure may open the valve causing accidents or problems to such processes.

Figure 6:
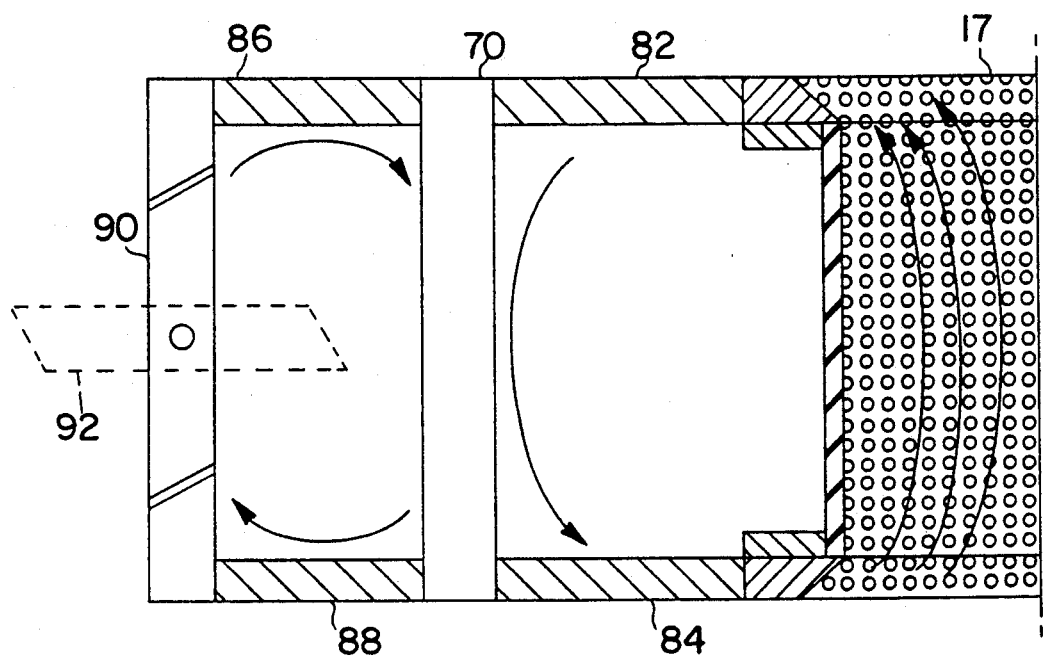
FIG. 6 is a third embodiment of a magnetic valve embodying the present invention in which a permanent magnet is used to establish the magnetic circuits in a similar way as shown in FIG. 4 and 5, but without the need for coils nor electric current to open or close the valve, because the magnetic field which is established through said circuits can be selectively done more or less strong in the pipe through which the particulate material is flowing depending on the deviation of the magnetic field through an alternate path.

FIGS. 6 and 7 show a third embodiment of the invention which makes use of the permanent magnet 70 and therefore is normally closed. The magnetic flow is normally along a path which passes through arms 82, 84 and material 17 and "closes" the valve (preventing flow of magnetic particles 17). This is accomplished by section 90 being selectively rotated to the dotted non-aligned position 92. Section 90 upon rotation to the aligned position to make physical connection between extension arms 86 and 88 causes a short circuit of the magnetic flow along an alternate path through section 90, which results in "opening" the valve to permit flow of material 17 through pipe 20. Rotation back to the position 92, disconnects the extension arms 86 and 88 and therefore, the magnetic flow of the magnetic field of the magnet 70 passes instead back through material 17 to thereby close the valve.

It should be understood that many other changes and modifications can be made within the broader scope of the invention. The number of arms can be varied from the preferred three illustrated (so as to be one to four or even more). Rings 22 and 24 may be formed of magnetic material sections circumferentially separated by non-magnetic sections (e.g. such as to isolate the arms from one another along each ring). Moreover, coils 50, 52 and 54 can be made up of three or six instead of four coil elements, arranged alternately by pairs in core elements 44, 46 and 48 for facilitating the establishing of the magnetic field by connecting said coil elements by pairs to each electric phase in a three phased connection. This type of connection allows the user to connect by pairs the coil elements and to have all three phases in each core, thus avoiding the danger of losing control over the magnetic valve in case of electric failures in any of the electric phases. This latter arrangement has proven to be very reliable in actual operation and along with the embodiment shown in FIG. 1 is one of the preferred embodiments of the invention.

What we claim is:

1. Method of regulating the flow of ferromagnetic particulates which comprises establishing a magnetic flux by means of a permanent magnet along a magnetically conductive loop inclusive of any ferromagnetic particulates in a physically unobstructed particulate flow path which flux is of an intensity sufficient to impede or stop the flow of such particulates through such path, deactivating, diminishing, or deviating such flux from said flow path to at least diminish the impeding effect of such flux on such particles.

2. Method of claim 1 wherein the diminishing of such flux is by establishing an electromagnetically induced counter flux opposing the flux in the loop from the permanent magnet.

3. Method of claim 1 wherein the deviating of the flux is by physically reorienting a magnetically conductive metal bar to close an alternative magnetically conductive loop of lower magnetic resistance for the flux from said permanent magnet, the magnetic field of which alterative loop is not effective within said particle flow path.

4. Apparatus for regulating the flow of ferromagnetic particulates which comprises a conduit made of a non-magnetic material defining an unobstructed flow channel for passing the particulates to be regulated; at least two magnetically conductive elements respectively mounted at spaced apart positions in said conduit and defining said flow channel at said positions, a plurality of means for producing a magnetic field through at least one magnetic circuit comprising within its path at least a portion of each of at least a pair of said spaced apart elements and at least a portion of any particulates present in said conduit between said elements; and means for selectively activating and deactivating said magnetic circuit, whereby the flow of said particulates through said flow channel is regulated.

5. Apparatus according to claim 4, wherein said means for selectively activating said magnetic circuit are electromagnets formed by a core element and coils.

6. Apparatus according to claim 4, wherein said means for selectively activating said magnetic circuit are permanent magnets.

7. Apparatus according to claim 5, further comprising means for deviating the trajectory of the magnetic field produced by said permanent magnets which passes through said particulates within said flow channel to an alternate trajectory outside said flow channel thereby weakening enough said magnetic fluid in said flow channel to allow flow of such particulates through the flow channel.

8. Apparatus according to claim 6, wherein said means for deviating the magnetic field produced by said permanent magnets are electromagnets which comprise a core and coils.

9. Apparatus according to claim 8, wherein said means for deviating the magnetic field produced by said permanent magnets are pieces of material of very low resistance to the magnetic field which selectively are connected to disconnected to said magnetic circuit.

10. Apparatus according to claim 6, wherein such elements each have a beveled ring-shaped form facing the interior of said flow channel, defining recesses effective to facilitate support of such particulates in said flow channel when in an active magnetic circuit including said elements.

* * * * *